June 14, 1932.  P. H. NAST  1,862,938
TRANSPORT TRUCK
Filed April 4, 1930   2 Sheets-Sheet 1
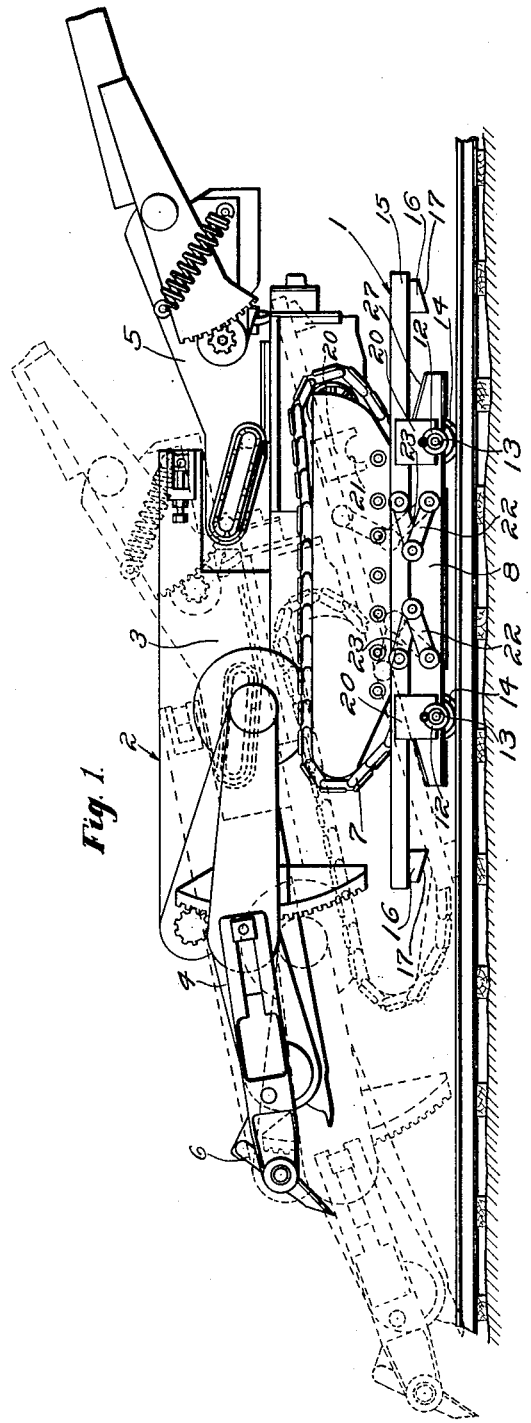
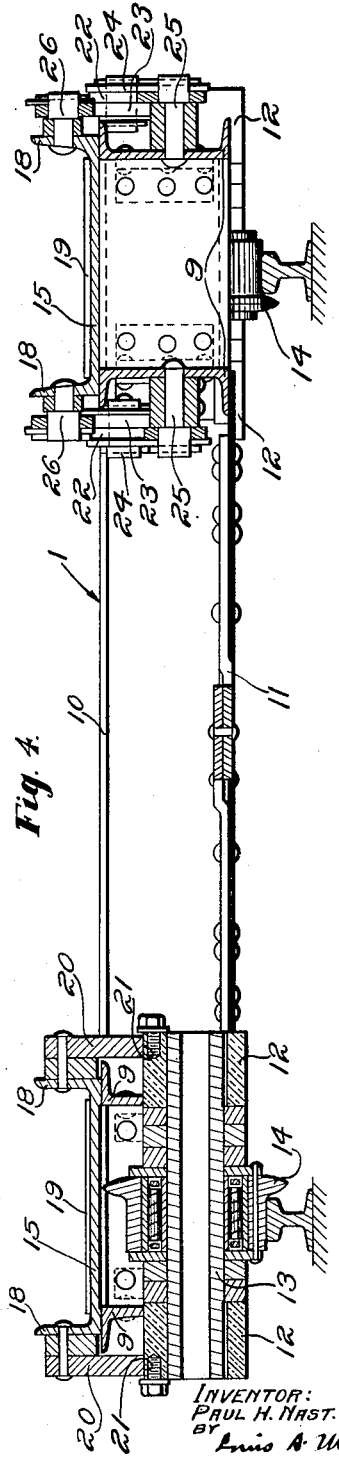
INVENTOR:
PAUL H. NAST.
BY
ATT'Y.

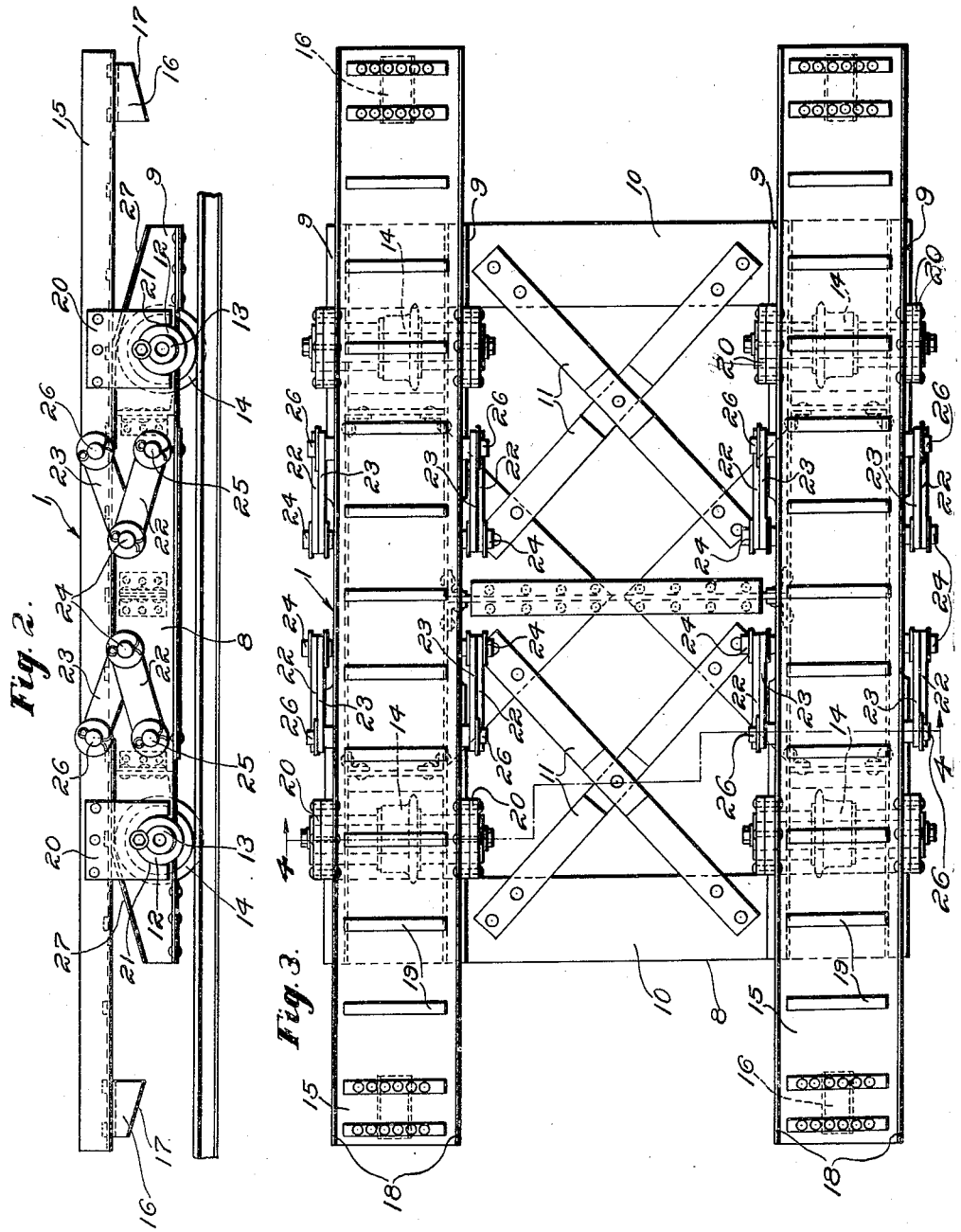

Patented June 14, 1932

1,862,938

UNITED STATES PATENT OFFICE

PAUL H. NAST, OF MICHIGAN CITY, INDIANA, ASSIGNOR TO SULLIVAN MACHINERY COMPANY, A CORPORATION OF MASSACHUSETTS

TRANSPORT TRUCK

Application filed April 4, 1930. Serial No. 441,691.

This invention relates to transport trucks and more particularly, but not exclusively, to transport trucks for coal mining apparatus.

An object of this invention is to provide an improved transport truck. Another object is to provide an improved truck adapted to transport a coal mining apparatus and of an improved construction whereby it is possible to load the apparatus at either end of the truck or to unload the apparatus from either end thereof, thereby materially facilitating the process of loading or unloading. A further object is to provide an improved transport truck especially adapted to use with a coal loading machine and having the characteristics above set forth and provided with improved means for guiding the traction members of such a machine during the loading and unloading thereof and for holding the machine from lateral displacement from the truck. These and other objects of the invention will hereinafter more fully appear in the course of the ensuing description and as more particularly pointed out in the appended claims.

In the accompanying drawings there is shown for purposes of illustration one form which the invention may assume in practice.

In these drawings,—

Fig. 1 is a side elevational view of an illustrative embodiment of the improved transport truck with a coal loading machine supported for transport thereon, one position of the truck and machine during the loading or unloading operation being indicated in dotted lines.

Fig. 2 is an enlarged side elevational view of the truck shown in Fig. 1.

Fig. 3 is a plan view of the improved transport truck.

Fig. 4 is a transverse vertical sectional view taken substantially on line 4—4 of Fig. 3.

In this illustrative construction the improved transport truck generally indicated 1 is designed especially for use in the transporting of a coal loading machine 2 which may be of the same general type as that disclosed in a copending application of one Andrew Hauge, Ser. No. 412,469, filed Dec. 7, 1929. The coal loading machine illustrated herein generally comprises a main frame 3 having usual front and rear conveying mechanisms 4 and 5 and a gathering mechanism 6 which is adapted to move the material to be loaded onto the front gathering conveyor mechanism from which the coal is discharged onto the usual rear discharge conveyor mechanism. The machine body is supported by endless track-laying treads 7 arranged at opposite sides thereof and driven, as are also the conveying and gathering mechanisms, from a motor carried by the machine body. These traction treads are of usual construction and comprise endless tread chains having wide flat traction elements by which the machine is propelled. It will be evident, however, that various types of mining apparatus other than that shown may be mounted for transport on the improved truck.

Now referring to the improved transport truck, it will be noted that the same herein comprises a truck frame 8 of fabricated structure including side frame members 9, transverse connecting plates 10 and diagonal bracing members 11, thereby forming a rigid low compact truck frame. The side members of the truck frame are in the form of vertical channel irons and carry bearing brackets 12 in which are supported axles 13 on which truck wheels 14 are journaled, the truck wheels being adapted to support the truck and run along the usual mine trackway. Superimposed on the truck frame and arranged at the sides thereof are pivoted frames 15 adapted to receive and guide the traction members of the coal loading machine and to support the latter in transport position on the truck frame. These tiltable frames carry at their opposite ends, track rail engaging shoes or block members 16 having inclined bottom surfaces 17 adapted to conform to the track surface when the frames are in their tilted positions. The tilting frames 15 are in the form of horizontal channel irons and have upturned sides 18 and having secured thereto cleats 19 with which the plates of the traction treads of the loading machine engage to facilitate loading of the machine on the truck. Secured to the sides of the tilting frames 15 are vertical plates 20 having open ended arcuate slots 21 which, when the tilting frames are in their normal transport position on the truck frame, overlie and engage the outer bearing blocks 12 for the truck wheel axles. The arcuate notches in these plates engaging the bearing blocks form a pivotal mounting for the tilting frames about which the latter tilt during the loading and unloading process, the frames 15 being adapted to tilt about the axes of either truck axles during loading at or unloading from one end or the other of the truck. When the tilting frames 15 are in the position shown in Fig. 2 the slotted plates 20 at the ends of the frames all engage the bearing blocks 12 of both the front and rear axles, thereby forming an extremely stable support for the machine during transport. To maintain the machine receiving frames 15 in position on the truck frame during tilting thereof, there are provided at the opposite sides thereof links 22 and 23 pivotally connected together at 24 and to the truck frame and tilting frames at 25 and 26 respectively. It will thus be seen that when the tilting frames 15 are swung about the axes of the right hand truck axles as shown in Fig. 2, the left hand ends of the tilting frames swing upward until the shoes 16 at the right hand end of the frames engage the track rails. The left hand link mechanisms at that time swing towards alinement and maintain in position the frames 15 on the truck irrespective of their tilted positions relative to the truck frame. When the machine receiving frames 15 tilt in the opposite direction the other track engaging shoes engage the track rails, while the other sets of link mechanisms maintain in position the machine receiving frames on the truck frame during tilting in this direction. To permit free tilting of the machine receiving frames, the side members of the truck frame are cut away or depressed at 27 and when the machine receiving frames are in their normal tilted position their bottom surfaces lie substantially in contact with the inclined surfaces on the truck frame. It will thus be seen that the machine can be loaded from either end of the truck or unloaded from either end thereof as conditions may require, thereby obviating the necessity of turning the truck around to receiving the coal loading machine, the truck being capable of receiving the loading machine at either end and thereby materially reducing the time and labor required to load and unload the machine at different places. During the loading operation on the truck the machine is propelled by the traction of its traction treads up the tilted frames 15 of the truck, the cleats 19 on the frames preventing slippage of the traction treads relative to the frames and the upstanding side flanges 18 thereof preventing lateral displacement of the treads from the truck. The truck is obviously of an extremely simple and rugged construction and due to its simplicity of construction and its comparatively few component parts, may be manufactured at a minimum of cost and, furthermore, since it is composed of no parts which readily get out of repair and adjustment, the up-keep cost is extremely low. Other uses and advantages of the improved transport truck will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A loading machine transport truck comprising a wheeled truck frame, and an adjustable machine receiving frame mounted on and overlying said truck frame and adjustable into different machine receiving positions relative thereto, the ends of said receiving frame overhanging the truck frame and having provision for receiving a loading machine at either end thereof.

2. A loading machine transport truck comprising a wheeled truck frame, and a tiltable machine receiving frame mounted on and overlying said truck frame and tiltable in a vertical endwise direction relative thereto, the ends of said receiving frame overhanging said truck frame and having provision for receiving a loading machine at either end thereof.

3. A coal loading machine transport truck comprising a wheeled truck frame, a machine receiving frame adjustably mounted on and overlying said truck frame and adjustable into different machine receiving positions relative thereto, the ends of said receiving frame overhanging said truck frame and having provision for receiving a loading machine at either end thereof, and means for limiting movement of the machine receiving frame in its different adjusted positions relative to the truck frame.

4. A loading machine transport truck comprising a wheeled truck frame comprising front and rear axles, and a machine receiving frame mounted thereon for tilting movement about either axle and having provision for receiving a loading machine at either end thereof.

5. A transport truck comprising a wheeled truck frame, and separate machine guiding frames located at the sides thereof and mutually independently adjustable relative thereto.

6. A transport truck comprising a wheeled truck frame, and machine guiding frames at the sides thereof having mutually independent tilting movement relative thereto.

7. A transport truck comprising a wheeled truck frame, and separate machine guiding frames located at the sides thereof and mutually independently adjustable relative thereto and adjustable about one truck wheel axis.

8. A transport truck comprising a wheeled truck frame, and machine guiding frames at the sides thereof having mutually independent tilting movement relative thereto and tiltable about either truck wheel axis.

9. A loading machine transport truck comprising a wheeled truck frame, separate guide frames arranged at opposite sides of and overlying the truck frame and adjustable into different machine receiving positions relative thereto, the ends of said guide frames overhanging said truck frame and having provision for receiving the traction treads of a loading machine at either end thereof.

10. A loading machine transport truck comprising a wheeled truck frame, and separate tiltable guiding frames at the opposite sides thereof and mounted for independent tilting movement relative thereto and each having provision for receiving a traction member of the loading machine.

11. A transport truck comprising a wheeled truck frame and parallel guideways arranged centrally on and at opposite sides of the truck and mounted for adjustment relative thereto, the opposite ends of said guideways overhanging a substantial distance said truck and said truck constituting the sole support for a load on said guideways during transport.

12. A transport truck comprising a wheeled truck frame and parallel guideways arranged centrally on and at opposite sides of the truck and mounted for adjustment relative thereto, the opposite ends of said guideways overhanging a substantial distance said truck and said truck constituting the sole support for a load on said guideways during transport, and means between said guideways and truck for maintaining said guideways in position on the truck frame during adjustment thereof.

13. A transport truck comprising a wheeled truck frame and parallel guideways arranged centrally on and at opposite sides of the truck and mounted for adjustment relative thereto, the opposite ends of said guideways overhanging a substantial distance said truck and said truck constituting the sole support for a load on said guideways during transport, and link mechanism between said guide members and truck for maintaining said guideways in position on the truck during adjustment thereof.

14. A transport truck comprising a wheeled truck frame, and members forming guideways arranged centrally on and at opposite sides of the truck frame above the truck wheels and having adjustment relative to the truck, the opposite ends of said guideways overhanging a substantial distance said truck and said truck constituting the sole support for a load on said guideways during transport.

15. A transport truck comprising a wheeled truck frame, and load receiving members forming guideways arranged at opposite sides of and overlying the truck frame above the truck wheels and adjustable into different load receiving positions relative thereto, the ends of said guideways overhanging said truck frame and having provision for receiving a load at either end thereof.

16. A transport truck comprising a wheeled truck frame, and a load receiving frame adjustably mounted on and overlying said truck frame and movable into different load receiving positions relative thereto, the ends of said load receiving frame overhanging said truck frame and having provision for receiving a load at either end thereof.

17. A transport truck comprising a wheeled truck frame, and a load receiving frame pivotally mounted on and overlying said truck frame and tiltable relative thereto in a vertical endwise direction and in opposite directions, the ends of said load receiving frame overhanging said truck frame and having provision for receiving a load at either end thereof.

18. A transport truck comprising a wheeled truck frame having front and rear truck wheels, and a frame pivotally mounted on said truck frame for tilting movement in either direction about either truck wheel axis and having provision for receiving a load at either end thereof.

19. A transport truck comprising a wheeled truck and parallel guideways arranged at opposite sides of and overlying the truck and mounted for adjustment relative thereto into different load receiving positions, the ends of said guideways overhanging said truck and having provision for receiving a load at either end thereof.

20. A transport truck comprising a wheeled truck and parallel guideways arranged at opposite sides of and overlying the truck and mounted for adjustment relative thereto into different load receiving positions, the ends of said guideways overhanging said truck and having provision for receiving a load at either end thereof, and means between said guideways and truck for maintaining said guideways in position on the truck during adjustment thereof into their different positions.

21. A transport truck comprising a wheeled truck and parallel guideways arranged at opposite sides of and overlying the truck and mounted for adjustment relative thereto into different load receiving positions, the ends of said guideways overhanging said truck and having provision for receiving a load at either end thereof, and link mechanism between said guideways and truck for maintaining said guideways in position on the truck during adjustment thereof into their different positions.

22. A transport truck comprising a wheeled truck adapted to run along a trackway laid on the ground and members forming guideways arranged at opposite sides of and overlying the truck frame above the truck wheels and having provision for receiving a load at either end, and having adjustment relative to said truck for receiving a load thereon in a plurality of directions relative to the truck.

In testimony whereof I affix my signature.

PAUL H. NAST.